Dec. 15, 1964  G. MONUS  3,161,149
RELEASABLE ROPE TIE FASTENER
Filed Jan. 7, 1964
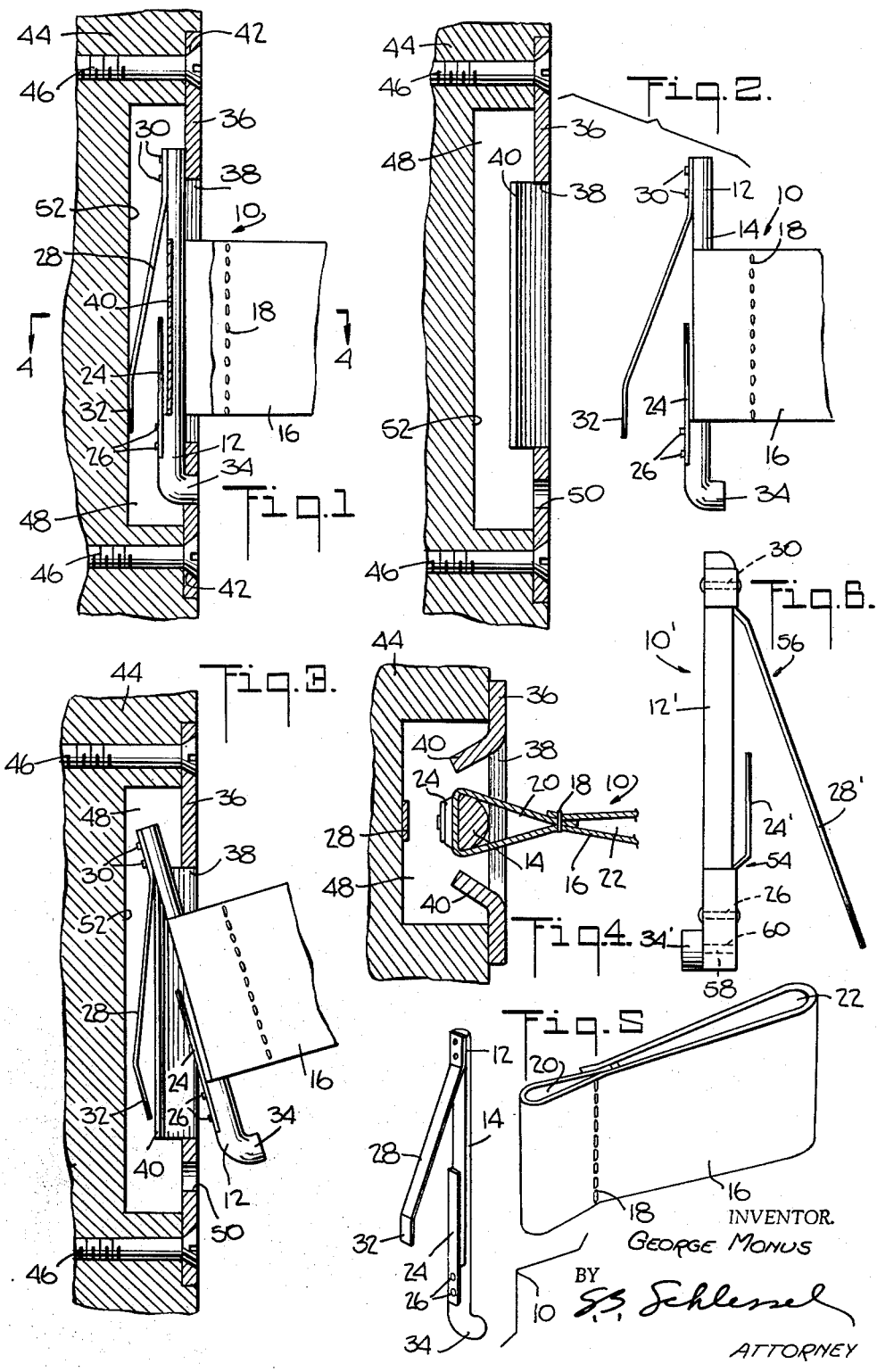
INVENTOR.
GEORGE MONUS
BY
S.S. Schlesel
ATTORNEY 3,161,149
RELEASABLE ROPE TIE FASTENER
George Monus, Levittown, Pa., assignor to The Molamake Company, New York, N.Y., a co-partnership
Filed Jan. 7, 1964, Ser. No. 336,246
5 Claims. (Cl. 105—369)

This invention relates to the field of cargo transportation, and has for its objective the provision of a releasable rope tie device adapted to be locked to anchoring means disposed on the inner surfaces of transportation means, such as vans, railroad box cars, ships, planes and the like, to which the items of cargo may be securely lashed in place, to prevent shifting and damage during transportation. The device is also so constructed that no metal protrudes beyond the surface of the anchoring means to press against and damage cargo.

In the ever increasing field of cargo transportation by various media, it has become increasingly important to utilize all available cargo space and to provide means to lash cargo securely to the surfaces of the transportation compartments, so that items of cargo cannot shift and sustain damage during transportation. To this end most cargo compartments come equipped with anchoring plates seated in spaced, parallel series in the walls and floors of the compartments (and sometimes in the roofs as well), so that items of cargo can be securely lashed to these anchoring plates by rope tie devices of various types.

In the present state of the art the fastening devices employed, while adequate to lock cargo in place have a serious drawback in that metal parts of these devices, constituting part of their construction, protrude into the cargo compartment and come into direct contact with the items of cargo, invariably under pressure. As a result, where the cargo comprises items of wood, such as furniture for example, or other non-metallic compositions, this often results in damage or breakage of the cargo in the securing process and during the transportation of the cargo, in the form of cuts, press-marks and outright breakage.

It is therefore the principal object of my invention to provide a rope tie device which has no metal parts protruding beyond the anchoring plate to which it is secured.

A second important object of my invention is to provide a rope tie device which can quickly be locked to an anchoring plate and which cannot be dislodged accidently.

A third important object of my invention is the provision of a rope tie device which is constructed to withstand heavy tension and to remain immovable thereunder.

Another important object of my invention lies in the provision of a rope tie device which can be quickly and easily released from the anchoring plate, when desired.

Still another important object of my invention lies in the provision of a rope tie device constructed of a minimum number of elements and inexpensive to manufacture, but, nonetheless, extremely sturdy and serviceable, and which can be re-used repeatedly without wear or deterioration.

These and other salient objects, advantages and functional features of my invention, together with the novel features of construction, composition and arrangement of parts, will be more readily apparent from an examination of the following description, taken with the accompanying drawings, wherein:

FIG. 1 is a side elevation of a preferred embodiment of my invention mounted in an anchoring plate secured to the surface of a transportation compartment, with the anchor plate and compartment surface in cross-section, and the strap element of the invention partly broken away;

FIG. 2 is an exploded view of the structure shown in FIG. 1;

FIG. 3 is a view similar to FIG. 1, but showing the rope tie device in the process of being secured to the anchor plate;

FIG. 4 is a cross-sectional view, taken on lines 4—4 of FIG. 1;

FIG. 5 is a top perspective exploded view of the embodiment shown in FIG. 1; and FIG. 6 is a side view of a modified embodiment of my invention.

Similar reference characters designate similar parts throughout the different views.

Illustrative of the embodiment shown by FIGS. 1–5, my releasable rope tie device 10 comprises a rod 12 having a reduced shank 14 around which a length of webbing or strap 16 is passed, the free ends of the strap 16 overlapping and secured together by some suitably sturdy means, such as the stitching 18, to form a bight 20 and an enlarged loop 22 through which the cargo locking ropes or cords are passed to lash the item of cargo to the tie device. The width of the strap 16 is less than the height of the shank 14, so that the strap 16 may be moved up or down upon the shank 14 in order to attach the device 10 to the cargo compartment or release it, as will be hereinafter shown. A retainer 24, parallel to and spaced from the shank 14, is secured by rivets 26 to the lower posterior surface of the rod 12, and serves to retain the strap 16 on the shank 14. A spring element 28, of spring steel or other suitable material, is secured to the upper posterior surface of the rod 12 by means of rivets 30, and extends rearwardly from the rod 12 in the direction of the retainer 24, at an acute angle to the rod 12, in normal position, the free end 32 of the spring element 28 being bent to be substantially parallel to the retainer 24. The lower end of the rod 12 is bent anteriorly to define a foot 34, which extends from the rod 12 at right angles thereto, for the purposes which will hereinafter be disclosed.

The anchor plate 36 is of substantially rectangular shape and is provided with a central elongated slot 38 having inwardly protruding lips 40. The anchor plate 36 is further provided, top and bottom with bores 42 through which the plate 36 is secured flush to the wall 44 (or roof or floor) of the cargo compartment (not otherwise shown) by means of recessed screws 46, the plate 36 being secured against an opening or cavity 48 in the wall 44. The anchor plate 36 is also provided with a central opening 50, disposed below the slot 38, which is of a diameter adapted to receive the foot 34 of the rope tie 10, when the latter is locked to the plate 36, but not substantially greater than the diameter of the foot 34. It is to be noted that anchor plates of the type hereinabove described are presently standard equipment on surfaces of cargo compartments, and that they enclose wall cavities, such as the cavity 48 in the wall 44 hereinabove described, which measure less than one inch in depth. It is important to note, therefore, that in my rope tie device 10 the free end 32 of the spring element 28 extends rearwardly from the anterior surface of the rod 12 more than one inch, so that, when the rope tie device 10 is secured to the anchor plate 36 the spring element 28 is compressed toward the retainer 24, producing sufficient tension within the cavity 48 to lock the rope tie 10 securely into position, as shown in FIG. 1, even without any tension developed by the engagement of the strap 16 with an item of cargo.

In operation, my rope tie device 10 is locked to the anchor plate 36 by first lowering the strap 16 to the bottom of the shank 14, and inserting the rod 12 at an angle through the slot 38 between the lips 40 (as shown by FIG. 3) into the wall cavity 48, until the top of the rod 12 clears the top of the slot 38. The rod 12 is then raised until the bottom edge clears the bottom edge of the slot 38 and the rod 12 is aligned vertically within the cavity 48 against the pressure of the spring element 38 against the posterior surface 52 of the cavity 48, and the rod 12 slid downward in the slot 38 until the foot 34 enters the opening 50 in the anchor plate 36. The rope tie 10 is now locked in place, retained in this position by the pressure of the spring element 28 against the surface 52 and the engagement of the foot 34 in the opening 50, and the strap 16 may be raised to a desired position, the loop 22 extending from the anchor plate 36 to be engaged by the cargo lashing ropes.

To remove the rope tie device 10, the strap 16 is slid down the shank 14 as before, the foot 34 pushed out of the opening 50 (by any sufficiently pointed instrument), and the rod 12 is lowered until its top clears the top of the slot 38, and then removed from the anchor plate 36 in a reversal of the insertion and locking operation.

Coming now to FIG. 6, there is shown a modified embodiment 10, of my invention without the strap 16 (which is identical in both embodiments). In this modification 10' the rod 12' is uniform in diameter and is provided with a retainer 24' which has intermediate bends, as at 54, to space it from the rod 12' to which it is secured by means of a rivet 26, and the spring element 28' is likewise secured to the rod 12' by means of a rivet 30, and angled therefrom by bends, as at 56.

The foot 34' is a separate element in this modification, however, and is provided with an integral pin 58 which is press-fitted into an opening 60 in the base of the rod 12'. Both embodiments, however, operate in the same manner, and are locked to and removed from the anchor plate 36 in the same way.

It will be seen from the foregoing description and from the drawings, that my releasable rope tie devices 10 and 10' can be quickly and easily attached to standard anchor plates now in use with cargo compartments, and can be as quickly and easily detached therefrom for selective positioning in the compartment and for continued re-use. It will be further seen that no metal parts of the devices protrude from the anchor plate to cause damage or breakage by pressure contact against cargo items.

It is to be understood that the embodiments thus shown and described are by way of illustration only, and various changes may be made in the construction, composition and arrangement of parts without limitation upon or departure from the spirit and scope of the invention, or sacrificing any of the advantages thereof inherent therein, all of which are claimed.

Having described my invention, I claim:

1. In combination with an anchor plate of the type described provided with
    an elongated slot,
    lateral lips extending inwardly from the slot and a central opening disposed below the slot,
    a rope tie device comprising a rod,
    a strap or webbing secured around the central portion of the rod and extending therefrom to form a rope-engaging loop,
    means to retain the strap or webbing to the rod,
    spring means secured to and extending from the posterior surface of the rod top at an angle to the plane of the rod and adapted to tension the rod against the posterior surface of the anchor plate, and
    a foot extending anteriorly from the base of the rod, the foot adapted to be releasably engaged by the central opening in the anchor plate to lock the rope tie device thereto.

2. A rope tie device as described in claim 1, the retaining means comprising a vertical member secured to the posterior surface of the rod base and extending upwardly therefrom in parallel, spaced relationship to the rod.

3. A rope tie device as described in claim 1, the spring means comprising a spring steel element secured to the posterior surface of the rod top and extending downwardly therefrom in the direction of the retaining means and at an angle to the plane of the rod.

4. A rope tie device as described in claim 1, the foot being integral with the base of the rod and extending anteriorly therefrom at right angles thereto.

5. A rope tie device as described in claim 1, the foot comprising a cylindrical member provided with a central pin, and
    the rod base provided with a central bore adapted to receive and retain the central pin in press-fit relationship to secure the foot to the rod at right angles thereto.

References Cited in the file of this patent
UNITED STATES PATENTS

| | | |
|---|---|---|
| 2,939,406 | Wilkoff | June 7, 1960 |
| 2,970,358 | Elsner | Feb. 7, 1961 |